United States Patent
Lutz

(10) Patent No.: US 9,387,918 B2
(45) Date of Patent: Jul. 12, 2016

(54) FRAME AND METHOD FOR PRODUCING SUCH A FRAME

(75) Inventor: Andreas Lutz, Graz (AT)

(73) Assignee: Facc AG, Ried im Innkreis (AT)

( * ) Notice: Subject to any disclaimer, the term of this patent is extended or adjusted under 35 U.S.C. 154(b) by 1030 days.

(21) Appl. No.: 13/264,862

(22) PCT Filed: Apr. 15, 2010

(86) PCT No.: PCT/AT2010/000107
§ 371 (c)(1),
(2), (4) Date: Oct. 17, 2011

(87) PCT Pub. No.: WO2010/118448
PCT Pub. Date: Oct. 21, 2010

(65) Prior Publication Data
US 2012/0034416 A1 Feb. 9, 2012

(30) Foreign Application Priority Data
Apr. 16, 2009 (AT) .................... A 590/2009

(51) Int. Cl.
*B32B 3/26* (2006.01)
*B64C 1/06* (2006.01)
*B29C 67/00* (2006.01)

(52) U.S. Cl.
CPC .............. *B64C 1/061* (2013.01); *B29C 67/0051* (2013.01); *Y10T 428/2419* (2015.01); *Y10T 428/24479* (2015.01)

(58) Field of Classification Search
CPC ................ B64C 1/061; B29C 67/0051; Y10T 428/2419; Y10T 428/24479
USPC .......... 428/156, 161, 163, 172; 244/119, 123, 244/125
See application file for complete search history.

(56) References Cited

U.S. PATENT DOCUMENTS

| | | | |
|---|---|---|---|
| 5,045,251 A | 9/1991 | Johnson | |
| 5,451,377 A * | 9/1995 | Asher et al. | ................... 428/167 |
| 6,114,012 A | 9/2000 | Amaoka et al. | |
| 6,508,909 B1 * | 1/2003 | Cerezo Pancorbo et al. | ........................ 156/306.6 |
| 6,638,466 B1 | 10/2003 | Abbott | |
| 7,074,474 B2 * | 7/2006 | Toi et al. | ...................... 428/102 |
| 2003/0052231 A1 | 3/2003 | Moon et al. | |

FOREIGN PATENT DOCUMENTS

| | | |
|---|---|---|
| CA | 2690590 A1 | 1/2009 |
| DE | 102006051457 A1 | 5/2008 |

(Continued)

OTHER PUBLICATIONS

Machine translation of DE102007030026, Feb. 2009.*

(Continued)

*Primary Examiner* — Donald J Loney
(74) *Attorney, Agent, or Firm* — Laurence A. Greenberg; Werner H. Stemer; Ralph E. Locher

(57) ABSTRACT

A frame for reinforcing a hull of a craft, particularly an aircraft, contains at least one frame element that is shaped in accordance with the curvature of the hull and has recesses at a side facing the hull for the passage of longitudinal beams of the craft. Each frame element is integrally formed from a fiber-reinforced plastic composite material and the recesses are configured as integral cut-outs of each frame element.

15 Claims, 4 Drawing Sheets

(56) References Cited

FOREIGN PATENT DOCUMENTS

| | | |
|---|---|---|
| DE | 102007030026 A1 | 1/2009 |
| RU | 2084343 C1 | 7/1997 |
| RU | 77842 U | 11/2008 |

OTHER PUBLICATIONS

Machine translation of DE 102006051457, May 2008.*
Liang Bin, "Low Cost Manufacturing Technology of Resin Matrix Composites for Aeronautical Application", Materials Review: Review vol. 23, No. 4, pp. 77-80, 85, Apr. 30, 2009—English abstract.

* cited by examiner

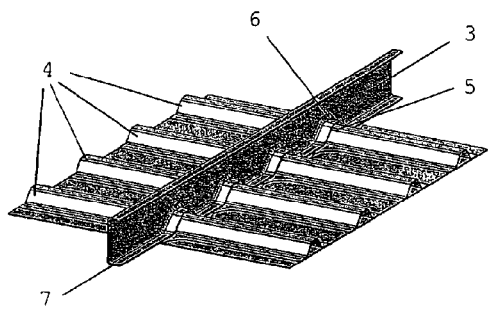
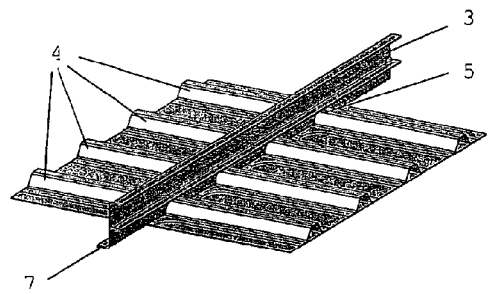
FIG. 5A
FIG. 4A
PRIOR ART
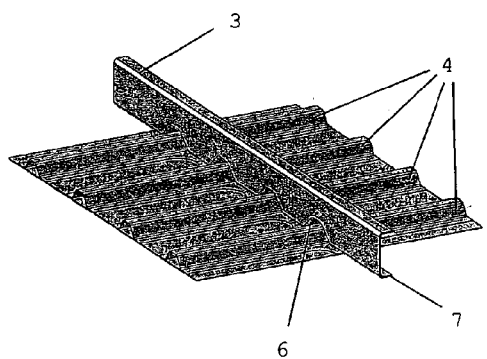
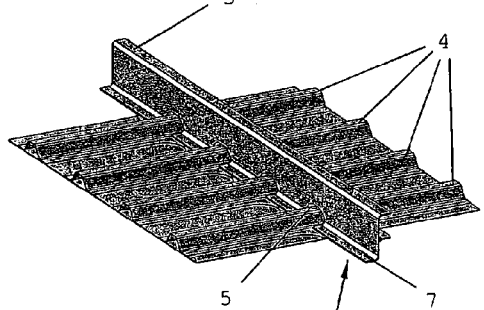
FIG. 5B
FIG. 4B
PRIOR ART
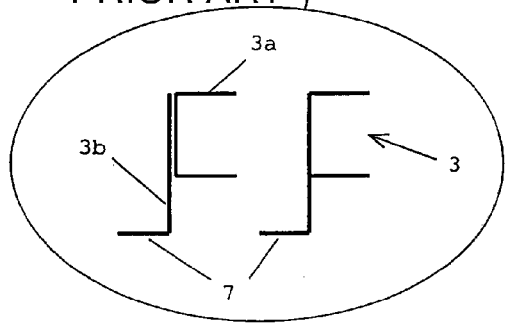
FIG. 4C
PRIOR ART

FRAME AND METHOD FOR PRODUCING SUCH A FRAME

BACKGROUND OF THE INVENTION

Field of the Invention

The invention relates to a frame for reinforcing the hull of a craft, particularly an aircraft, according to the preamble of the main apparatus claim.

Frames are carrying members for reinforcing and/or stiffening the hulls of boats, ships, aeroplanes and other crafts and form the "ribs" of the craft in an easy-to-see way. Typically, a plurality of annular frames is provided circumferentially on the inside of the craft's hull, spaced apart at regular intervals. In the longitudinal direction of the hull, longitudinal beams and/or stringers are provided, extending transversely to the frames and passing through corresponding recesses of the frames. While wood or steel are often used as a material for frames and other structural elements in ship-building, frames for aircraft are usually made of aluminium or other lightweight metals in order to reduce the overall weight.

On the one hand, integral aluminium frames, which are shaped in accordance with the curvature of the aircraft's hull, are known from the prior art. The recesses for the bottom structure, which are formed by the longitudinal beams extending transversely to the frames, are usually provided in the frames by milling or cutting.

On the other hand, two-piece frames with a framework and a frame foot attached to the aeroplane's hull (cf. FIG. 3) are known from the prior art as well. In this case, the framework is connected to the frame foot by rivets or fixed to it in a different way. Here the recesses for the longitudinal beams are milled out of the frame foot, as will be discussed with reference to FIG. 3 below again.

Frames with milled recesses, however, require great effort to produce. Considering the high number of members, milling definitely constitutes a major cost factor in manufacturing.

In order to avoid milling the recesses, differential frames with multiple members connected by rivets are used frequently. Such frames are comprised of an integral framework, such as a C profile, which is fixed to the hull by a plurality of retaining anchors attached to the hull. In this case, the retaining anchors are arranged spaced apart from each other, so that the gaps between them form recesses for the passage of longitudinal beams. Therefore, in these frames, the longitudinal beams extend between the retaining anchors, with the longitudinal beams resting beneath the framework, so that no recesses must be provided in the framework itself. As a consequence, such frames do not require milling of recesses, but a plurality of retaining anchors is needed to form the recesses for the passage of the longitudinal beams, which is a drawback. Additionally, attaching the retaining anchors to the framework is time-consuming and cost-intensive.

Furthermore, using fibre-reinforced plastic composite materials for structural members in aeroplanes in principle has been known in the prior art as well. By employing fibre composite materials, the overall weight of the aeroplane is reduced so that fuel consumption can be significantly lowered. At the same time, the members made of fibre composite materials are characterised by their high rigidity and stiffness as well as their low tendency towards material fatigue and/or corrosion.

In conventional frames made of fibre composite materials, the recesses for the longitudinal beams and/or stringers are created either by milling, as in aluminium frames, or by a more differential way of construction.

In DE 10 2007 030 026 A1 a structural member for an aircraft with a frame element made of carbon-fibre-reinforced plastic (CFRP) has been shown. On the side facing the hull, the frame element comprises a flange curved in accordance with the inner curvature of the aeroplane's hull, which serves for attacking the frame element to the hull. In addition, a plurality of recesses facing the hull is provided for the passage of longitudinal beams. These recesses are provided in the frame element by cutting and/or milling them out during the production process. Thereby, however, the flange in the region of the recesses is removed as well, so that the flange of the finished frame element is disrupted in the region of the recesses. This leads to a weakening of the frame element in its entirety, since the flange is of crucial importance for the stiffness and/or rigidity of the frame element. As a consequence, DE 10 2007 030 026 A1 suggests unifying the frame element with a transverse beam element for connecting two arced portions of the frame element in a transverse way in order to increase mechanical stability. However, this involves high constructional effort, and the additional transverse beam elements contribute to a disadvantageous increase in the aeroplane's overall weight.

DE 10 2006 051 457 A1 shows a frame element made of fibre-reinforced plastic composite material with a foot portion and/or flange abutting against a hull of an aircraft and having recesses for the passage of stringers with T-shaped profiles. In the regions between the recesses, the flange shows a thickness that varies in a step-like manner, so that the flange follows the step-shaped bottom structure, which is formed by the foot portions of the T stringers, in a form-fit way. The recesses here, however, are included into the frame element by milling and/or cutting as well, so that the flange is disrupted in the region of the recesses again. As a consequence, the mechanical stability of this frame element is also compromised by the milled recesses.

BRIEF SUMMARY OF THE INVENTION

It is therefore the object of the present invention to create a simply constructed frame, particularly for aeroplanes, which combines low weight and high mechanical stability, especially in case of overload. In addition, a particularly inexpensive and efficient method for producing such a frame is to be provided. The drawbacks of known frames and methods for producing frames are to be avoided or at least reduced.

In the frame of the initially mentioned type, this is achieved by the features according to the characterising clause of the main apparatus claim, as well as by the features according to the characterising clause of the main method claim regarding the initially mentioned method.

By producing the frame integrally from fibre-reinforced plastic composite material and forming the recesses for the passage of the longitudinal beams as integral pockets of each frame element, the time-consuming and cost-intensive milling of the recesses may be avoided. An advantage in comparison to multi-piece frame elements is that a frame element that fits accurately to the bottom structure is provided directly, without individual parts having to be connected by rivets and aligned in the aeroplane with respect to the longitudinal beams. Finally, integrally forming the pockets provides a particularly stable and rigid frame, fulfilling the high requirements for stress capacity and/or mechanical stability, even in case of overload.

In a particularly favourable embodiment, each frame element comprises a flange facing the hull, with the flange being arranged in the region of a recess and extending along the outline of the recess. In this way, a continuous flange, which is not disrupted in the region of the recesses, is provided. In the regions between the recesses, the flange abuts against the hull and can be attached to it, for example by rivets; in the regions of the recesses, the flange is pulled up, so that the flange follows the outline of the recesses. As a consequence, the flange follows the outline of the bottom structure, which is formed by the hull and/or the longitudinal beams, over the entire extension of the frame element. With the aid of the continuous flange, a particularly stable frame can be achieved, as a reduction of the stability due to absence of the flange facing the hull in the region of the recesses is avoided.

For increasing the stiffness of the frame element, it has proven advantageous if the frame has a cross section that is substantially T-shaped, I-shaped, Z-shaped or preferably C-shaped.

A particularly stable and lightweight frame can be achieved if each frame element is produced from interwoven (i.e. braided) fibres and/or bundles of fibres and a matrix made of plastic.

The frame elements are preferably produced by the liquid moulding method, with the resin injection method and/or RTM (resin transfer moulding) and VARTM (vacuum assisted RTM) methods having proven particularly suitable. In these methods, the dry fibres are being placed in a closed mould before evacuating the mould and injecting the liquid resin, under pressure if required. Finally, the resin is cured by adding heat.

Alternatively, each frame element may be produced by the PRE-PREG (pre-impregnated fibres) method as well. In this method, fibres, bundles of fibres or mats of fibres that have been pre-impregnated with matrix material, i.e. already soaked in it, are applied to the core, vented and cured in an autoclave, under pressure and heat if required.

Considering increased stress on the frame elements at connection sites to structural elements, which may be provided in the interior of the aeroplane, specifically a floor of a passenger space and/or freight space, it is favourable for each frame element to have bulges for receiving structural elements on the side facing away from the hull.

In a particularly favourable embodiment of the method according to the invention, it is provided for fibres or bundles of fibres to be applied form-fit to a core, with the core comprising indentations corresponding to the recesses of each frame element in order to form the integral pockets of each frame element. According to this, the fibres, such as carbon, glass or aramid fibres, are combined to form bundles of fibres and positioned on the core tightly and closely adjacent to each other. In this way, the core will give the frame element its future shape and design, as the cross section of the core corresponds to the desired profile geometry, in particular a C profile, T profile, I profile or Z profile, and also comprises indentations corresponding to the recesses of the finished frame element.

It is particularly favourable for the bundles of fibres to be interwoven with each other on the core. A special weaving machine for interweaving one or more layers of preferably unidirectional fibres with each other on the braided core is provided for this purpose.

An especially efficient and cost-saving method for producing a frame may be achieved if the core, which has been wrapped by the fibres and/or interwoven bundles of fibres, is parted substantially in a central plane of its longitudinal extension, so that two frame elements are provided. According to this, the first step in this preferred embodiment comprises producing a pre-mould by applying fibres and/or bundles of fibres to the core, in particular interweaving them on the core, and then impregnating and curing them. Next, this pre-mould is parted, preferably in a central plane of the pre-mould, so that two mirror-symmetrical frame elements are obtained.

This can be used with a particular advantage if a core with a substantially square-shaped cross section is used, providing two frame elements with a substantially C-shaped cross section by parting the pre-mould in a central plane.

Should it be intended for the frame element be formed as a hollow body, it would be favourable to remove the core afterwards. For example, a core made of foam may be chemically dissolved. A particular advantage, however, is to have a water-soluble core, which is produced by compressing sand and/or gypsum and can be easily swept away by water in the end. On the other hand, re-usable cores, for example made of aluminium, may also be used. In principle, however, it is possible for the core to remain inside the finished frame element as well.

The invention will be discussed in more detail below by way of preferred embodiments that are illustrated in the drawings, without being limited to them. Individually, in the drawings:

BRIEF DESCRIPTION OF THE SEVERAL VIEWS OF THE DRAWING

FIGS. 4a and 4b each show a perspective view of a reinforcing structure with a frame and multiple longitudinal beams according to the prior art;

FIG. 4c shows front views towards the frame element according to FIG. 4b;

FIGS. 5a and 5b each show a perspective view of a reinforcing structure with a C frame according to the invention and multiple longitudinal beams;

DESCRIPTION OF THE INVENTION

Figure 1:
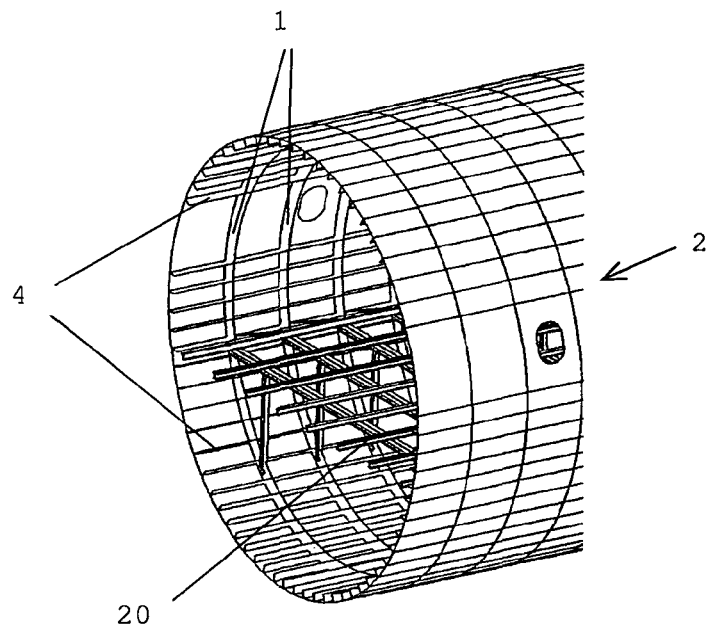
FIG. 1 shows a perspective view of a portion of an aeroplane's hull.

In FIG. 1 an aeroplane's hull 2 with a substantially cylindrical shape is illustrated schematically. On the inside of the hull 2, a plurality of regularly spaced frames 1 is provided, extending annularly in accordance with the inner curvature of the hull 2. Transverse to the frames, in the longitudinal direction of the hull 2, longitudinal beams and/or stringers 4 are provided, preferably spaced at regular angular intervals, forming a two-dimensional reinforcing and/or stiffening structure of the hull 2 together with the frames 1.

In the interior of the hull 2, further structural elements 20, such as a floor 20 of a freight space or a passenger space, are provided, with the passenger space floor 20 comprising multiple supporting bars, which are arranged substantially vertically, to support the floor 20 against the hull 2; in addition, a plurality of regularly spaced transverse beams is provided, arranged vertically with respect to the supporting bars and being fixed to them in a conventional manner.

Figure 2:
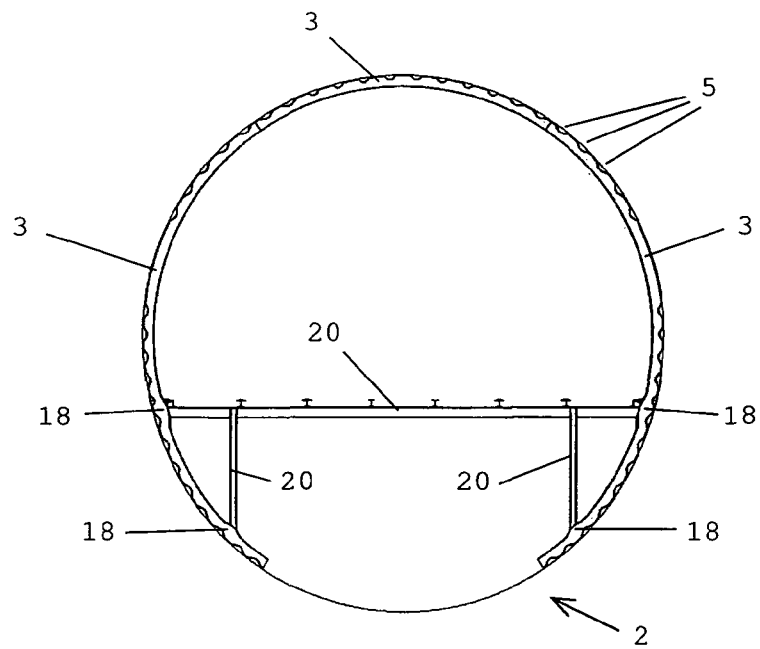
FIG. 2 shows a sectional view of the aeroplane's hull according to FIG. 1.

The frame 1 may be comprised of multiple frame elements 3; in FIG. 2 three frame elements 3 are illustrated, all of which are connected to each other on their respective end portions by connecting elements that are known per se, such as retaining brackets or the like, so that an annular frame 1 is provided all in all.

As can be seen in FIG. 2, recesses 5 are provided on the side of the frame elements 3 facing the hull 2, through which the longitudinal beams 4, which are not shown in FIG. 2 for reasons of clarity, pass. Special requirements concerning the absorption of stress apply to the connecting sites from the supporting bars and/or the transverse beams of the passenger space floor to the frames 1. For this, individual frame elements 3 may comprise reinforced spots, particularly bulges 18, in the region of the connecting sites to the passenger space floor in order to attach the respective supporting bars and/or transverse beams of the passenger space floor 20, as will be discussed in more detail in connection with FIGS. 7a and 7b.

Figure 3:
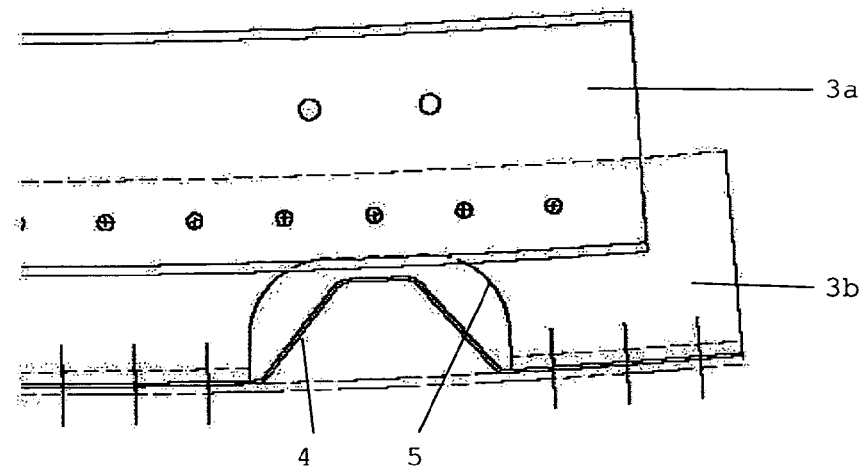
FIG. 3 shows a detail of a two-piece frame according to the prior art.

FIGS. 3 and 4a to 4c show conventional frame elements 3 for an aeroplane's hull 2, as they are already known from the prior art. More specifically, a two-piece frame 3a, 3b is illustrated in FIG. 3, consisting of an integral framework 3a, such as a C profile 3a, and a frame foot 3b. The frame foot 3b comprises a bottom flange 7, which abuts against the inside of the hull 2 and serves to attach the frame 3a, 3b to the hull 2. The C profile 3a is fixed, particularly by screws or rivets, to the frame foot 3b in the region of its side facing away from the hull 2, so that overall a frame with a substantially F-shaped cross section is provided. Milled recesses 5 for the passage of the longitudinal beams 4 are provided in the frame foot 3b on the side facing the hull 2.

FIGS. 4a and 4b show perspective views of known frames 3 with a plurality of longitudinal elements 4 passing through the recesses 5. The illustrated frames 3 comprise an F profile with an invertedly oriented bottom flange 7, wherein the F profile may be formed as a two-piece, as has been discussed in connection with FIG. 3, or integrally. In FIG. 4c a two-piece F profile with a frame foot 3b and a C profile 3a attached to the frame foot 3b is shown on the left-hand side; an integral F frame is illustrated on the right-hand side of FIG. 4c.

In both known methods the recesses 5 are provided by milling, cutting and the like in the frames. As can best be seen in FIG. 4b, however, this is accompanied by a disadvantageous weakening of the frame element as the bottom flange 7 is removed in the regions of the recesses 5.

The principle known as "fail safe", according to which the effects of a failure of the frames are to be designed as nonhazardous as possible, requires the known frames to have a profile geometry including multiple flanges, in particular the F geometry shown in FIG. 4c, in order to keep the disadvantageous effects on the stability of the frame, which are due to the missing bottom flange 7 in the region of the recesses 5, at a low level.

According to this, other profile geometries would be severely weakened because of the partial removing of the bottom flange by milling the recesses 5; a C profile, for example, would lose approximately 40% of its cross-sectional area in the region of the recesses 5, so that the required absorption of stress, in particular regarding pressure, could not be guaranteed in a reliable manner any more.

In FIGS. 5a and 5b a frame element 3 according to the invention is shown, which is produced integrally from fibrereinforced plastic, with the recesses 5 being formed as integral pockets 6, i.e. not provided by laborious and cost-intensive measures such as milling, cutting and the like in the frame element 3. Furthermore, the "fail safe" condition is met by integrally forming the pockets 6, not weakening the frame element by milling the recesses 5. As can be seen in FIG. 5a, the integral forming of the pockets 6 enables a C-shaped cross section, thereby advantageously and considerably reducing the weight of the frame element as opposed to F profiles or other geometries with three or more flanges.

The recesses 5 are preferably arranged circumferentially along each frame element 3, spaced apart at regular angular intervals. In the illustrated embodiment, the recesses 5 exhibit the shape of a prism with a substantially trapezium-shaped base area, while other designs are possible here as well, such as a rectangular base area and in particular a geometry with rounded edges.

The bottom flange 7 of the C-shaped frame elements 3 follows the bottom structure formed by the hull 2 and the plurality of longitudinal beams 4. In the region of the recesses 5 the flange 7 is arranged to extend along the outline of the recesses 5 and rest on the longitudinal beams 4. Since the flange 7 follows the outline of the recesses 5 and/or the complementarily designed longitudinal beams 4, the flange 7 extends in the region of the recesses 5 without disruptions as well. By pulling the flange 7 up and/or down in the region of the integral pockets 6, only little area is lost, as the flange 7 is not removed by a milling of the recesses 5.

Of course an increased stress capacity may be achieved by the integral forming of the pockets 6 in other profile geometries as well. In this context, frame elements 3 with I-shaped, Z-shaped or T-shaped cross sections, for example, are conceivable.

Figure 6:
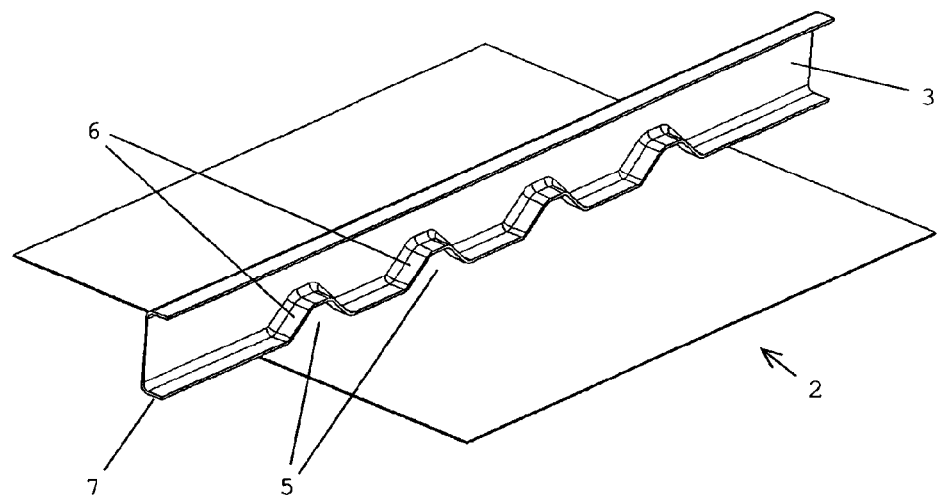
FIG. 6 shows a perspective view of a detail of the C frame according to FIGS. 5a and 5b.

In FIG. 6 a detail of the frame element 3 according to the invention is illustrated, with the longitudinal beams 4 not shown for reasons of clarity. Here, the frame element 3 consists of interwoven fibres and/or bundles of fibres made of carbon, glass, aramid or the like, which have been impregnated by a matrix material made of plastic, for example epoxy resin.

For providing the shown frame element 3 with a C-shaped cross section, a core is wrapped form-fit by the fibres and/or bundles of fibres. Preferably, a plurality of unidirectional fibres is joined to form bundles of fibres and then interwoven on the braided core. The shape of the braided core corresponds exactly to the desired design of the frame element to be produced. In order to achieve this, the core comprises a plurality of indentations having shapes corresponding to the recesses 5 of the finished frame element. In this way, the recesses 5 are formed as integral pockets 6 and are not required to be milled and/or cut in a laborious and expensive discrete step.

The fibres are joined by a matrix made of plastic, with the impregnating being possible before application to the braided core (by a method known as the PREPREG method) or after interweaving on the braided core (with the aid of the resin transfer moulding method and/or the vacuum assisted resin transfer moulding method).

In producing the C-shaped frame elements, first, a premould is formed by interweaving bundles of fibres on a braided core with a square-shaped cross section and according to the shape of formed indentations representing the recesses of the future frame element. Then the pre-mould is cut in two in its central plane, thereby obtaining two mirrorinverted C-shaped frame elements. In the end, the core may be removed and reused; in case of a core made of foam and/or a core made of compressed sand and gypsum being present, the core may also be dissolved chemically and/or swept out by water, respectively.

Figures 7A, 7B:
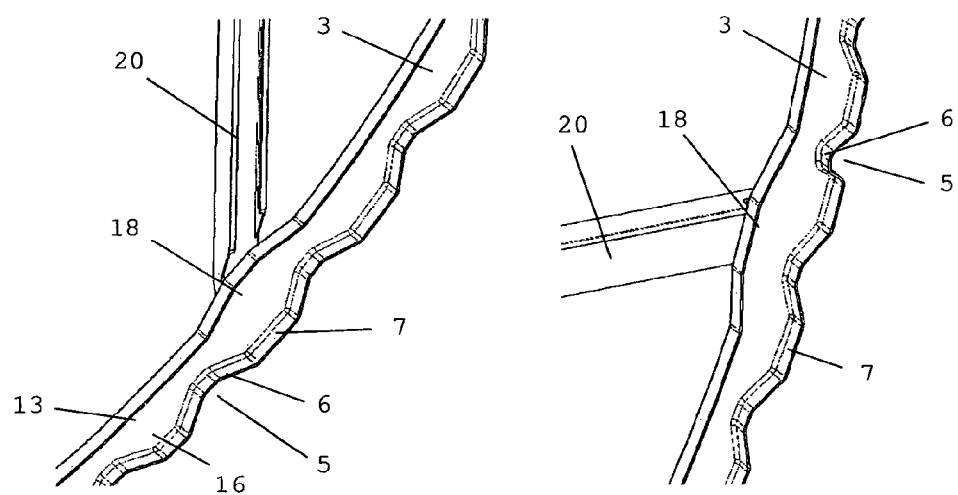
FIGS. 7a and 7b each show a perspective view of a detail of the connecting sites of a passenger space floor to the C frame according to FIGS. 5a, 5b and 6.

FIGS. 7a and 7b show details of the connecting sites from the supporting bars and/or the transverse beams of the passenger space floor 20 to the respective frame elements 3. The end portions of the supporting bars and/or the transverse beams are connected to the respective regions of the frame elements 3 by rivets or in a different reliable way. In order to be able to cope with the increased stress on the connecting sites, the frame elements 3 comprise bulges 18 in this region to enlarge the cross-sectional area of the C profile. In production, the bulges 18 are created by at least one additional layer of fibres and/or interwoven bundles of fibres in this region.

In the embodiment shown, the bulge 18 extends substantially towards the interior, by enlarging the region of the connecting sites in the connecting region from the flange 7 facing the hull to the flange facing away from the C profile hull; in order to further strengthen the connecting sites, the flanges may be provided with a larger extension in the longitudinal direction of the hull 2.

The research work that led to the present invention has been supported by the European Union's Seventh Framework Programme (FP7/2007-2013) under grant agreement no. 213371.

The invention claimed is:

1. A frame for reinforcing a hull of a craft, the frame comprising:
   at least one frame element shaped in accordance with a curvature of the hull and having recesses formed therein at a side facing the hull for a passage of longitudinal beams of the craft, said frame element further having a flange facing the hull, said flange disposed in a region of at least one of said recesses and extending along continuously around an outline of said one recess uninterrupted, said frame element integrally formed from a fiber-reinforced plastic composite material and said recesses configured as integral pockets of said frame element, said frame element produced from at least one of interwoven fibers or interwoven bundles of fibers and a matrix made of plastic, wherein a number of fibers of said fiber-reinforced plastic composite material is substantially constant along a length of said frame element and a packing density of said fibers is increased in a region of said recess as compared to a region without said recess.

2. The frame according to claim 1, wherein said frame element has a cross section selected from the group consisting of a T-shaped cross section, an I-shaped cross section, a Z-shaped cross section and a C-shaped cross section.

3. The frame according to claim 1, wherein said frame element is produced by a liquid molding method.

4. The frame according to claim 1, wherein said frame element is produced by a pre-impregnated fibers method.

5. The frame according to claim 1, wherein said frame element contains bulges for receiving structural elements at a side facing away from the hull.

6. The frame according to claim 1, wherein each of said recesses has a shape of a prism with a trapezium-shaped base area, and edges of said recess are rounded.

7. The frame according to claim 1, wherein said recesses are disposed circumferentially on said frame element, spaced apart at regular angular intervals.

8. A method for producing a frame having at least one frame element, for reinforcing a hull of a craft, which comprises the steps of:
   producing the frame element to be shaped in accordance with a curvature of the hull and with recesses at a side facing the hull for a passage of longitudinal beams;
   providing the frame element with a flange facing the hull, the flange extending in a region of a recess along continuously around an outline of the recess uninterrupted;
   forming the frame element integrally from a fiber-reinforced plastic composite material, wherein a number of fibers of the fiber-reinforced plastic composite material is substantially constant along a length of the frame element and a packing density of the fibers is increased in a region of the recesses as compared to a region without the recesses;
   configuring the recesses as integral pockets of the frame element; and
   applying at least one of the fibers or bundles of fibers form-fit to a core containing indentations corresponding to the recesses of the frame element for forming the integral pockets of the frame element, by interweaving the fibers or bundles of fibers with each other on the core.

9. The method for producing the frame according to claim 8, which further comprises forming a cross section of the frame element to have a shape selected from the group consisting of a T profile, an I profile, a Z profile and a C profile.

10. The method for producing the frame according to claim 8, which further comprises impregnating the fibers with a matrix material made of plastic to form a fiber-reinforced plastic composite material.

11. The method for producing the frame according to claim 10, which further comprises venting the fiber-reinforced plastic composite material applied to the core and then curing under pressure and heating to be finished.

12. The method for producing the frame according to claim 8, which further comprises wrapping the core by the fibers.

13. The method for producing the frame according to claim 8, which further comprises forming the core to have a substantially square-shaped cross section.

14. The method for producing the frame according to claim 8, which further comprises removing the core at an end of the method.

15. The method for producing the frame according to claim 8, wherein the interwoven bundles of fiber is parted substantially in a central plane of its longitudinal extension so that two frame elements are produced.

* * * * *